(12) United States Patent
Seo

(10) Patent No.: US 6,959,448 B1
(45) Date of Patent: Oct. 25, 2005

(54) RADIO VOD SYSTEM

(75) Inventor: Cheong-Jeong Seo, Songnam (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1024 days.

(21) Appl. No.: 09/704,202

(22) Filed: Nov. 1, 2000

(30) Foreign Application Priority Data

Nov. 1, 1999 (JP) ............................. 1999-47897

(51) Int. Cl.$^7$ ........................................... H04N 7/173
(52) U.S. Cl. ........................ 725/87; 725/62; 725/86; 725/91; 455/3.01; 455/3.06; 455/517
(58) Field of Search ..................... 725/86, 87, 91–95, 725/98–101, 105, 114–118, 62; 455/3.01, 455/3.05, 3.06, 517

(56) References Cited

U.S. PATENT DOCUMENTS

| | | | |
|---|---|---|---|
| 3,936,594 A * | 2/1976 | Schubin et al. ............. | 380/238 |
| 5,068,733 A * | 11/1991 | Bennett ........................ | 725/73 |
| 5,557,317 A * | 9/1996 | Nishio et al. ................. | 725/92 |
| 5,784,095 A * | 7/1998 | Robbins et al. ............... | 725/49 |
| 5,796,423 A * | 8/1998 | Robbins et al. ............. | 725/151 |
| 6,516,466 B1 * | 2/2003 | Jackson ....................... | 725/62 |

FOREIGN PATENT DOCUMENTS

| | | | | |
|---|---|---|---|---|
| CN | 1214174 A | 4/1999 | .......... | H04N 7/173 |
| JP | 08-228334 | 9/1996 | | |
| JP | 08-294111 | 11/1996 | .......... | H04N 7/173 |
| KR | 97-19609 | 4/1997 | | |

* cited by examiner

*Primary Examiner*—Ngoc Vu
(74) *Attorney, Agent, or Firm*—Cha & Reiter, L.L.C.

(57) ABSTRACT

A radio VOD (Video-On-Demand) system is disclosed. A server provides a video file and an audio file, and a server manager manages the server so as to transmit a video file and an audio file at the user's request. An exchange converts the video file and the audio file provided from the server through a network to the corresponding video and audio signals. A mobile terminal receives the video and audio signals from the exchange through separate channels, and reads only the user requested data from the received video and audio signals. The mobile terminal comprises first and second tuners for separately receiving the video signal and the audio signal, respectively; a signal processor for detecting a video signal and an audio signal, selected by the user, from the video and audio signals received through the first and second tuners; first and second decoders for decoding the video and audio signals detected by the signal processor, respectively; a video display for outputting the decoded video signal; and an audio output device for outputting the decoded audio signal.

20 Claims, 3 Drawing Sheets

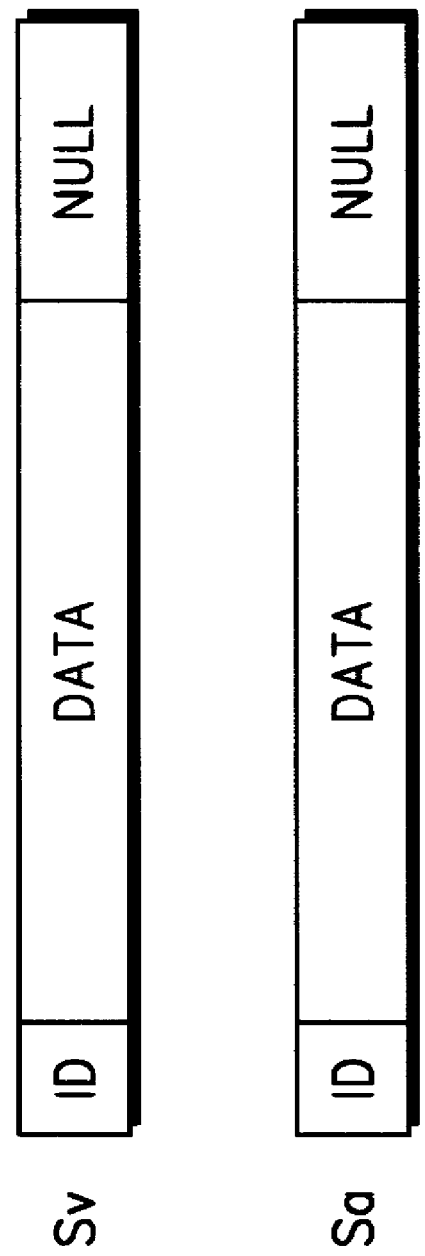

RADIO VOD SYSTEM

CLAIM OF PRIORITY

This application makes reference to and claims all benefits accruing under 35 U.S.C. Section 119 from an application for RADIO VOD SYSTEM filed earlier in the Korean Industrial Property Office on Nov. 1, 1999 and there duly assigned Serial No. 47897/1999.

BACKGROUND OF THE INVENTION

1. Field of the Invention

The present invention relates generally to a radio VOD (Video-On-Demand) system. More particularly, the present invention relates to a radio VOD system that can provide various multimedia files through radio communication at the time desired by the user.

2. Description of the Related Art

A prior art radio VOD system comprises of a server, which is an information provider, a network, and an indoor receiver such as a set-top box. The server stores video information and its associated application software for controlling the video information in a bundle, and selectively transmits the video information to an end user device (i.e., set-top box) at the request of the end user.

In regard to the network of the VOD system, a wideband network is used which is capable of transmitting the video information at a rate of several Mbps. The set-top box, which is an indoor receiver installed in a home of the end user, serves as a terminal station of a wideband transmission line. The wideband transmission line is a physical transmission medium, and decodes digital information transmitted from the server. The decoded digital information is displayed on a TV monitor. Furthermore, the set-top box transmits a user's request to the server.

At the present time, active research is being carried out on a method for building a radio VOD system between a base station and a mobile terminal using radio communication. Unlike the current prior art radio VOD system, a VOD system does not depend on a physical transmission line.

For example, a radio VOD system introduced by NTT company, Japan, is designed such that the base station and the mobile terminal can wirelessly exchange data using a frequency of 25 GHz at a rate of 10 Mbps for short distances of 50 to 100 m. The radio VOD system introduced by NTT company can be simultaneously accessed by a maximum of 16 users and can transmit information at a rate of up to 50 Mbps via the base station. However, such short distance of 50 to 100 m limits the practical use for such systems.

That is, such wireless VOD systems using the high frequency band is extremely limited by the permissible distance between the base station and the mobile terminal. To increase the permissible distance, it is necessary to increase significantly the costs of building the system. Further, since the number of users who can simultaneously access the system is limited to 16, it is not possible to meet the needs of many users exceeding such a limited number. In addition, since the high frequency band is used, the operating costs of the mobile terminal and the exchange increase as well.

SUMMARY OF THE INVENTION

It is, therefore, an object of the present invention to provide a low cost radio VOD system which can stably transmit and reproduce data even at a low frequency band.

To achieve the above and other objects, the presently claimed invention provides a radio VOD (Video-On-Demand) system. In the radio VOD system, a server provides a video file and an audio file, and a server manager manages the server so as to transmit a video file and an audio file at a user's request. An exchange converts the video file and the audio file provided from the server through a network to the corresponding video and audio signals. A mobile terminal receives the video and audio signals from the exchange through separate channels, and reads only the user requested data from the received video and audio signals.

Preferably, the mobile terminal comprises first and second tuners for separately receiving the video signal and the audio signal, respectively; a signal processor for detecting a video signal and an audio signal, selected by the user, from the video and audio signals received through the first and second tuners; first and second decoders for decoding the video and audio signals detected by the signal processor, respectively; a video display for outputting the decoded video signal; and an audio output device for outputting the decoded audio signal.

In an embodiment, a radio VOD (Video-On-Demand) system comprises:

- a server means for providing data comprising a video file and an associated audio file to at least one user;
- a server manager for managing the transmission of the video file and an audio file of the data requested by at least one user;
- an exchange means for converting the video file and the audio file provided from the server through a network to provide separately a video signal and an associated audio signal for separate wireless transmission of the requested data; and,
- a mobile terminal means for receiving through separate channels the separate wireless transmission of the video signal and the associated audio signal converted by the exchange means, and outputting only the requested data comprising the video file and the associated audio file to at least one user.

According to a first aspect of the invention, the exchange means includes a base station for separate wireless transmission of the video signal and the associated audio signal.

According to another aspect of the invention, the base station is a portion of the exchange means which is remote from a remainder of the exchange means.

The exchange means may include one of an Asynchronous Transfer Mode (ATM) and a high-speed Ethernet switching device.

The server means may include a separate video server and an audio server.

In addition, the server manager may communicate with at least one of a PSTN (public switched telephone network) and a LAN (local area network) for remote access thereto.

According to a second aspect of the present invention the mobile terminal means comprises:

- first and second tuners for separately receiving the video signal and the associated audio signal, respectively, from the exchange means;
- a signal processing means for detecting the video signal and the associated audio signal of the data selected by the user, from a plurality of video signals and their respectively associated audio signals received through the first and second tuners;
- first and second decoders for decoding the video and audio signals detected by the signal processing means, respectively;

a video display for outputting the decoded video signal of the data selected by the user; and, an audio output device for outputting the associated decoded audio signal of the data selected by the user.

In addition, the video and audio signals output from the exchange means each comprise an ID (identification) field, a data field and a null data field.

According to another aspect of the present invention, the signal processing means of the mobile terminal means reads the ID field of the received video and audio signals from the first and second tuners to detect the video signal and associated audio signal of the data selected by the user for decoding by the first and second decoders.

The signal processing means may comprise a digital signal processor, and the data requested by the user is a multimedia file.

In addition, the mobile terminal means may include transmission means to request data from the VOD system by wireless communication. The transmission means includes means for wireless communication with the exchange means.

In another aspect of the present invention, the exchange means comprises means for receiving the data request of the user transmitted by wireless communication from the mobile terminal means. The frequency of the data request transmitted by the mobile terminal means to the exchange means may be different than a frequency of the video signal and a frequency of the audio signal transmitted by the exchange means to the mobile terminal means.

BRIEF DESCRIPTION OF THE DRAWINGS

The above and other objects, features, and advantages of the present invention will become more apparent from the following detailed description when taken in conjunction with the accompanying drawings in which:

FIG. 3 is a diagram illustrating a data format according to an embodiment of the present invention.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail since they would obscure the invention in unnecessary detail.

Figure 1:
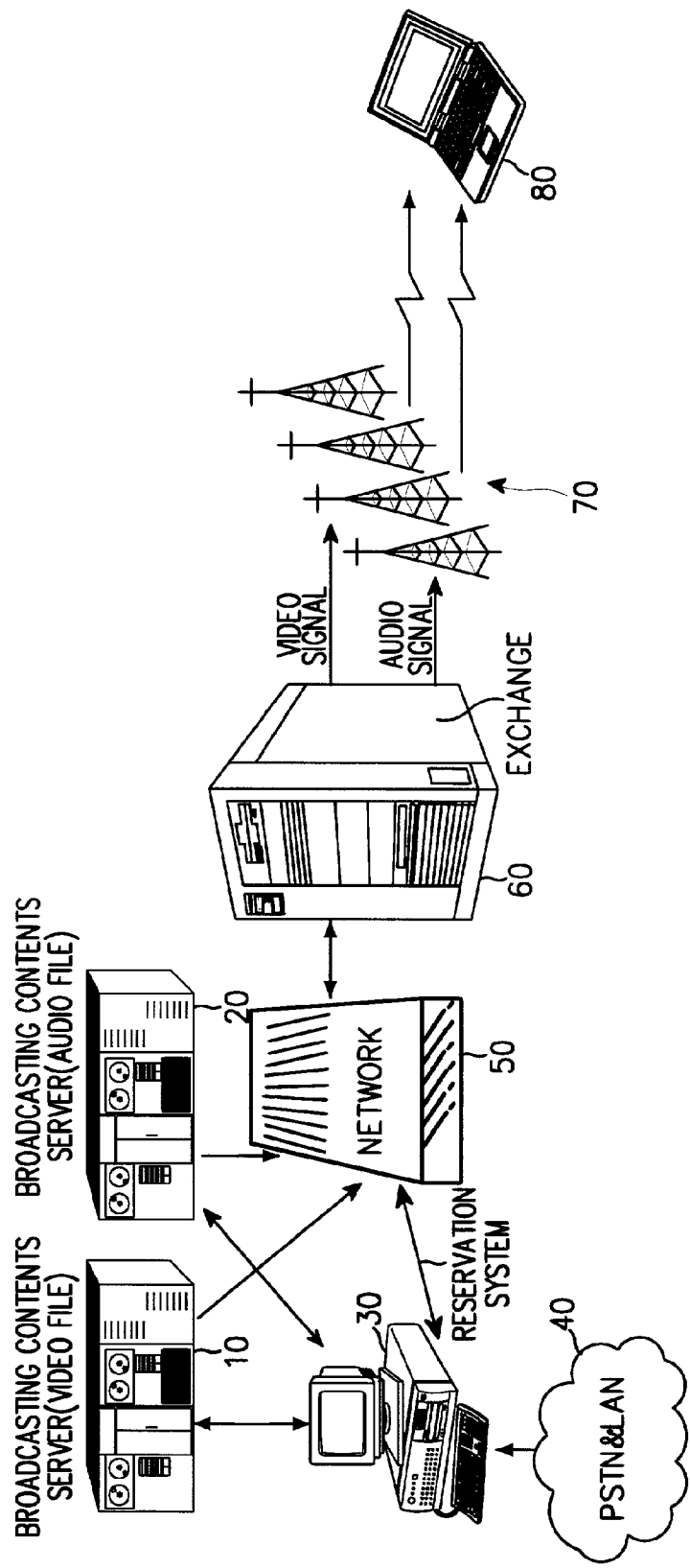
FIG. 1 is a diagram illustrating a radio VOD system according to an embodiment of the present invention.

FIG. 1 illustrates a radio VOD system according to an embodiment of the present invention.

With reference to FIG. 1, a first broadcasting contents server 10 stores and manages video files (i.e. a video server), and a second broadcasting contents server 20 stores and manages audio files (i.e. an audio server). A personal computer (PC) 30, which can be connected to a PSTN (public switched telephone network) and/or LAN (local area network) 40 for remote access thereto, is a server manager.

The server manager checks a user desired (or selected) list and various reserved states, and transmits the corresponding data list to the first and second contents servers 10 and 20. An exchange 60 converts the video and audio files provided from the first and second content servers 10 and 20 through a network 50 to the corresponding video and audio signals. The exchange 60 may include an ATM (Asynchronous Transfer Mode) switching device or a high-speed Ethernet switching device. The video and audio signals output from the exchange 60 are transmitted to a mobile terminal 80 through the base station 70 and restored to the original video and audio signals.

Figure 2:
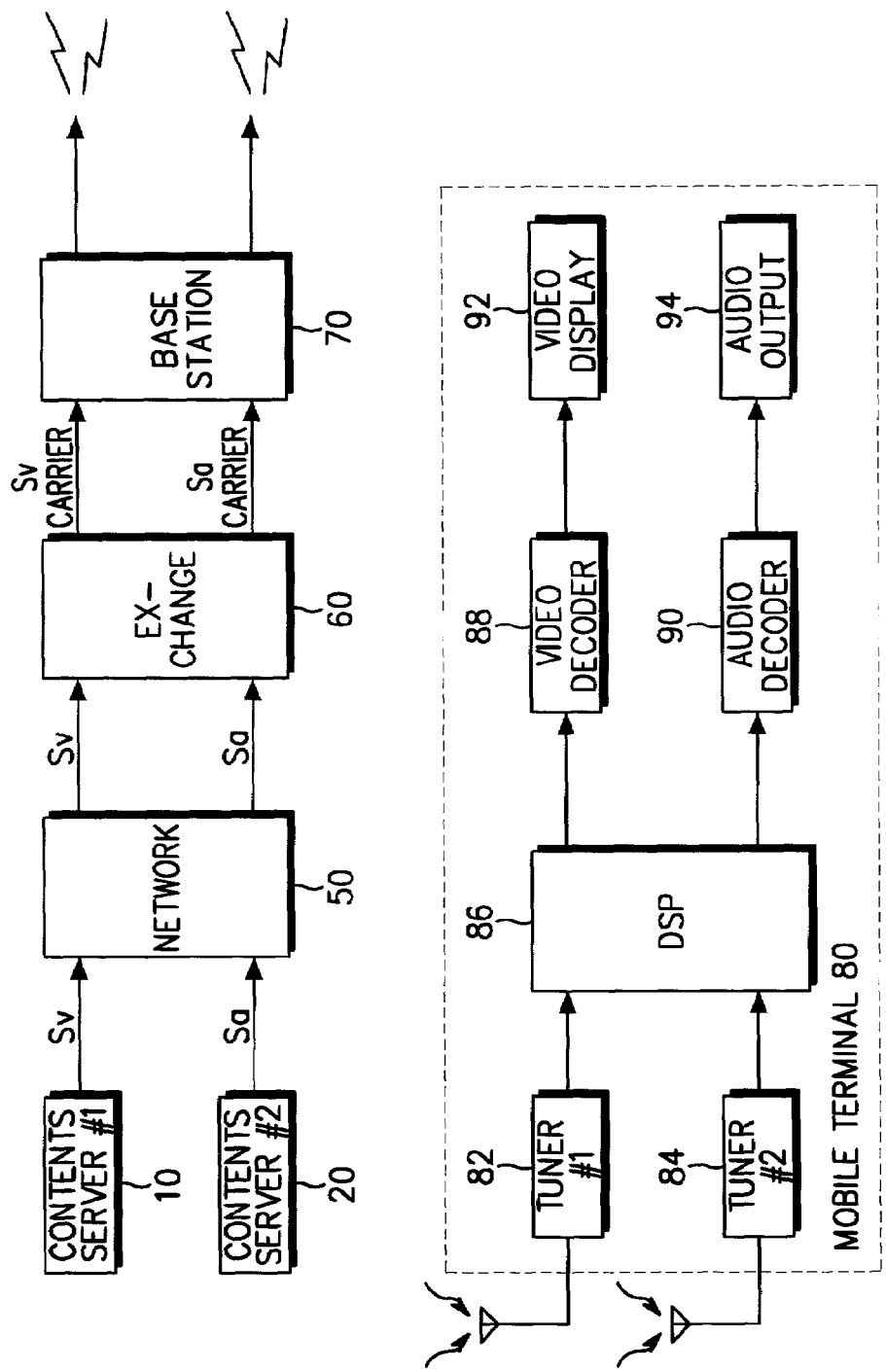
FIG. 2 is a detailed diagram illustrating the mobile terminal of FIG. 1.

FIG. 2 illustrates a detailed block diagram of the mobile terminal 80. A detailed description of the radio VOD system will be made below with reference to FIG. 2.

When a video signal and an audio signal are transmitted together as one signal, the amount of transmitted data relatively increases. Therefore, in the radio VOD system according to an embodiment of the present invention, a transmission side separately transmits the video from the video server and the audio data from the audio server, and a reception side (i.e., mobile terminal) receives the video and audio data using separate tuners, separately decodes the received video and audio data, and outputs the decoded video and audio data through a monitor and a speaker.

For example, by way of the illustration shown in FIG. 2, in an embodiment of the radio VOD system according to present invention, when a user requests video and audio files from system via terminal 80, the first and second contents servers 10 and 20 (under the control of server manager 30) respectively read a video file Sv and an audio file Sa. The video file Sv and the audio file Sa read by the first and second contents servers 10 and 20 are transmitted to the exchange 60 through the network 50. The exchange 60 encodes the video file Sv and audio file Sa into the corresponding baseband signals, and outputs the encoded baseband signals in the form of carriers.

The video file Sv and the audio file Sa, which were output in the form of carriers, are received at the mobile terminal 80 through the base station 70. Specifically, the mobile terminal 80 receives the video file Sv and the audio file Sa through a first tuner 82 and a second turner 84, respectively. The video file in the form of the carrier is transmitted as an NTSC broadcasting signal. The video and audio signals received through the first and second turners 82 and 84 are digital processed by a digital signal processor (DSP) 86.

FIG. 3, illustrates an example of the data format of the video file Sv and the audio file Sa. That is, the video file Sv and the audio file Sa each are comprised of an ID (Identification) field, a data field and a null data filed. The ID field is filled with information for identifying the user who has requested the video file and the audio file.

According to the embodiment of the presently claimed invention, the DSP 86 outputs only the user requested data by searching the ID fields of the received video file Sv and audio file Sa. A video decoder 88 and an audio decoder 90 decode video data and audio data output from the DSP 86, respectively. A video display (or monitor) 92 and an audio output device (or speaker) 94 output the decoded video and audio data provided from the video decoder 88 and the audio decoder 90, respectively.

In the aforementioned manner, the user of the mobile terminal 80 can view and listen to the video and audio files that he has requested wirelessly, through the monitor and the speaker.

In addition, the data requestrd from the user by the mobile terminal 80 may be sent by wireless communication to the exchange 60 via the base station 70. Thus, true two-way wireless communication between the VOD system and the user is possible.

Moreover, the mobile terminal includes transmission means to transmit the data request by wireless communication. The frequency of the data request preferably is of a frequency which differs from the frequencies of both the audio signal and the video signal transmitted via base station 70 to the mobile terminal 80.

The exchange means may contain means for receiving the data request by wireless transmission from the mobile terminal, which would include means for decoding the radio signal transmitted by the mobile terminal to extract, for example, an identifier of the data requested by the user. Such an identifier could be an ID portion which identifies the particular file or files stores in the VOD system.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A radio VOD (Video-On-Demand) system comprising:
    a server means for providing data comprising a video file and an associated audio file to at least one user;
    a server manager for managing the transmission of the video file and the audio file of the data selectively requested by at least one user;
    an exchange means for converting the video file and the audio file provided from the server means through a network to provide separately at baseband a video signal and an associated audio signal for separate wireless transmission of the requested data; and,
    a mobile terminal means for receiving through separate channels the separate wireless transmission of the video signal and the associated audio signal at baseband converted by the exchange means, and outputting only the requested data comprising the video file and the associated audio file to the at least one user.

2. The radio VOD system according to claim 1, wherein the exchange means includes a base station for separate wireless transmission of the video signal and the associated audio signal.

3. The radio VOD system according to claim 2, wherein the base station is a first portion of the exchange means which is remote from a second portion of the exchange means.

4. The radio VOD system according to claim 1, wherein the exchange means includes one of an Asynchronous Transfer Mode and a high-speed Ethernet switching device.

5. The radio VOD system according to claim 1, wherein the server means includes a video server and an audio server.

6. The radio VOD system according to claim 1, wherein said server manager communicates with at least one of a PSTN (public switched telephone network) and a LAN (local area network) for remote access thereto.

7. The radio VOD system according to claim 1, wherein the mobile terminal means comprises:
    first and second tuners for separately receiving the video signal and the associated audio signal, respectively, from the exchange means;
    a signal processing means for detecting the video signal and the associated audio signal of the data selected by the user, from a plurality of video signals and their respectively associated audio signals received through the first and second tuners;
    first and second decoders for decoding the video and audio signals detected by the signal processing means, respectively;
    a video display for outputting the decoded video signal of the data selected by the user; and,
    an audio output device for outputting the associated decoded audio signal of the data selected by the user.

8. The radio VOD system as according to claim 1, wherein the video and audio signals output from the exchange means each comprise an ID (identification) field, a data field and a null data field.

9. The radio VOD system as according to claim 7, wherein the video and audio signals output from the exchange means each comprise an ID (identification) field, a data field and a null data field.

10. The radio VOD system according to claim 9, wherein the signal processing means of the mobile terminal means reads the ID field of the received video and audio signals from the first and second tuners to detect the video signal and associated audio signal of the data selected by the user for decoding by the first and second decoders.

11. The radio VOD system according to claim 1, wherein the data requested by the user is a multimedia file.

12. The radio VOD system according to claim 7, wherein the data requested by the user is a multimedia file.

13. The radio VOD system according to claim 1, wherein the data requested by the user is a multimedia file.

14. The radio VOD system according to claim 7, wherein the signal processing means comprises a digital signal processor.

15. The radio VOD system according to claim 1, wherein the mobile terminal means includes transmission means to request data from the radio VOD system by wireless communication.

16. The radio VOD system according to claim 7, wherein the mobile terminal means includes transmission means to request the data from the radio VOD system by wireless communication.

17. The radio VOD system according to claim 15, wherein the transmission means includes means for wireless communication with the exchange means.

18. The radio VOD system according to claim 16, wherein the transmission means includes means for wireless communication with the exchange means.

19. The radio VOD system according to claim 7, wherein one of the exchange means comprises means for receiving the data request transmitted by wireless communication from the mobile terminal means.

20. The radio VOD system according to claim 19, wherein a frequency of the data request transmitted by the mobile terminal means to the exchange means is different than a frequency of the video signal and a frequency of the audio signal transmitted by the exchange means to the mobile terminal means.

* * * * *